United States Patent
Nagy et al.

(10) Patent No.: US 6,841,500 B2
(45) Date of Patent: Jan. 11, 2005

(54) BIMETALLIC INDENOINDOLYL CATALYSTS

(75) Inventors: Sandor Nagy, Naperville, IL (US); Barbara M. Tsuie, Cincinnati, OH (US); William J. Sartain, West Chester, OH (US)

(73) Assignee: Equistar Chemicals, LP, Houston, TX (US)

(*) Notice: Subject to any disclaimer, the term of this patent is extended or adjusted under 35 U.S.C. 154(b) by 105 days.

(21) Appl. No.: 10/308,842

(22) Filed: Dec. 3, 2002

(65) Prior Publication Data

US 2004/0106514 A1 Jun. 3, 2004

(51) Int. Cl.[7] .................. B01J 31/00; B01J 37/00; C08F 4/02; C08F 4/60
(52) U.S. Cl. ............... 502/117; 502/113; 526/127; 526/134; 526/141; 556/11
(58) Field of Search .................. 502/117, 113; 526/127, 134, 141; 556/11

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,539,124 A | 7/1996 | Etherton et al. | 548/402 |
| 5,637,659 A | 6/1997 | Krishnamurti et al. | 526/133 |
| 5,648,440 A | 7/1997 | Sugano et al. | 526/132 |
| 5,902,866 A | 5/1999 | Nagy et al. | 526/133 |
| 6,140,432 A * | 10/2000 | Agapiou et al. | 526/141 |
| 6,211,311 B1 | 4/2001 | Wang et al. | 526/131 |
| 6,232,260 B1 | 5/2001 | Nagy et al. | 502/155 |
| 6,262,197 B1 * | 7/2001 | Aulbach et al. | 526/127 |
| 6,414,162 B1 | 7/2002 | Nagy | 548/406 |
| 6,440,889 B1 | 8/2002 | Tsuie | 502/152 |
| 6,451,724 B1 | 9/2002 | Nifant'ev et al. | 502/103 |
| 6,642,400 B2 * | 11/2003 | Holtcamp et al. | 556/11 |
| 6,686,306 B2 * | 2/2004 | Shih | 502/113 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

Copending U.S. Appl. No. 10/421,062.*
Copending U.S. Appl. No. 10/421,077.*
Reddy et al., *Organometallics* 8 (1989) 2107.
Jungling et al., *J. Organometal, Chem.* 460 (1993) 191.
Soga et al., *J. Mol. Catal. A* 128 (1998) 273.
Noh et al., *J. Organometal. Chem.* 580 (1990) 90.
Tian et al., *Macromol. Chem. Phys.* 203 (2002) 31.
Buu–Hoi and Xuong, *J. Chem. Soc* (1952) 2225.
*J. Organometal. Chem.* 518 (1996) 1.
*J. Am. Chem. Soc.* 118 (1996) 8024.
*Organometallics* 15 (1996) 4045.

\* cited by examiner

*Primary Examiner*—Mark L. Bell
*Assistant Examiner*—Jennine M. Brown
(74) *Attorney, Agent, or Firm*—Jonathan L. Schuchardt

(57) ABSTRACT

Catalyst systems useful for olefin polymerization are disclosed. The catalysts include a bimetallic complex that incorporates two linked indenoindolyl groups, each of which is pi-bonded through its cyclopentadienyl ring to one of the metals. Compared with conventional indenoindolyl complexes, the bimetallic complexes of the invention have enhanced ability to give polyolefins with desirably low melt indices. Certain bimetallic indenoindolyl complexes also provide a way to broaden polymer molecular weight distribution and thereby improve processability simply by regulating the amounts of comonomer and activator used in the polymerization.

12 Claims, No Drawings

BIMETALLIC INDENOINDOLYL CATALYSTS

FIELD OF THE INVENTION

The invention relates to catalyst systems that include bimetallic complexes having covalently linked indenoindolyl ligands. The catalysts are useful for olefin polymerization

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they often produce polymers with improved physical properties.

Since the mid-1980s, scientists have become increasingly interested in bimetallic metallocenes, and in particular, how two metal centers communicate with each other via electronic and through-space interactions (see, e.g., Reddy et al. *Organometallics* 8 (1989) 2107). Cooperative effects are most likely when the two metal centers are electronically coupled through a conjugated pi-electron system. Ultimately, understanding cooperative effects should let polyolefin manufacturers fine-tune polymer properties by varying catalyst structure.

Jungling et al. (*J. Organometal. Chem.* 460 (1993) 191) describes bimetallic complexes in which two zirconocenes are linked through the Cp rings via a 1,4-phenylene group. Soga et al. (*J. Mol. Catal. A* 128 (1998) 273) describes dinuclear metallocenes linked by a biphenyl group. More recently, others have studied the impact of changing the nature and length of the linking group. Noh et al. (*J. Organometal. Chem.* 580 (1999) teaches polymethylene- and polysiloxane-linked dinuclear metallocenes. For these bimetallic complexes, catalyst activity increases as the linking group becomes longer and the catalytic centers can behave more independently. Tian et al. (*Macromol. Chem. Phys.* 203 (2002) 31) synthesized a series of sila-linked dinuclear zirconocene complexes and also concluded that catalyst activity and polymer molecular weight are influenced by changing the nature and length of the linking group.

Organometallic complexes that incorporate "indenoindolyl" ligands are known (see U.S. Pat. Nos. 6,232,260 and 6,451,724). In many of the known complexes, an indenoindolyl group is bridged to another group, which may be a second indenoindolyl group. The ligands are versatile because a wide variety of indanone and arylhydrazine precursors can be used to produce indenoindoles. Thus, substituent effects can be exploited and catalyst structure can be altered to produce polyolefins having a desirable balance of physical and mechanical properties. The complexes disclosed in the '260 and '724 patents are monometallic.

One drawback of at least some of the indenoindolyl complexes is their relatively limited ability to produce polyolefins having a desirably low melt index. For example, our gas-phase ethylene polymerizations with an indenoindolyl(cyclopentadienyl)zirconium dichloride complex, performed in the absence of hydrogen, often failed to give linear low density polyethylene (LLDPE) having a melt index less than about 1. Ideally, a catalyst will give polymers with fractional melt indices (preferably 0.1–0.8) when the polymerization is performed in the absence of hydrogen.

We also found that conventional indenoindolyl complexes often provide limited opportunities for controlling molecular weight distribution (MWD). For example, the complexes typically give polyethylenes having melt index ratios (MIR) in a narrow window in the range of about 17–19, and this value is independent of the amount of comonomer or aluminum activator used. Because of their relatively low MIR values, the resulting polyolefins have a limited degree of processability. Ideally, the MIR value could be increased in a controlled way to enhance processability.

U.S. Pat. No. 6,414,162 describes bimetallic complexes that derive from dianionic indenoindolyl ligands. These complexes can include two metals, each of which is bonded to two indenoindolyl groups, and the indenoindolyl groups are not otherwise linked together.

In sum, there is considerable current interest in bimetallic complexes and their potential value as catalysts for the manufacture of polyolefins because bimetallic complexes can have electronically coupled active sites. Known indenoindolyl complexes, which are mostly monometallic, have limited ability to give polyolefins with desirably low melt indices and broadenable MWDs. The industry would benefit from the availability of new bimetallic catalysts, especially ones that can provide polymers with desirable attributes. Particularly valuable catalysts would capitalize on the inherent flexibility of the indenoindolyl framework.

SUMMARY OF THE INVENTION

The invention is a catalyst system which comprises an activator and a bimetallic complex. The complex includes two Group 3–10 transition metals and two monoanionic indenoindolyl groups, each of which is pi-bonded through its cyclopentadienyl ring to one of the metals. A divalent linking group joins the indenoindolyl groups through an indenyl carbon or an indolyl nitrogen of each indenoindolyl group. Finally, the complex includes two or more ancillary ligands bonded to each metal that satisfy the valence of the metals.

Catalyst systems of the invention are inherently versatile because of the ability to control polymer properties by exploiting substituent effects on the indenoindolyl framework. Compared with conventional indenoindolyl complexes, the bimetallic complexes of the invention also have enhanced ability to give polyolefins with desirably low melt indices. We surprisingly found that certain bimetallic indenoindolyl complexes also provide an opportunity to broaden polymer molecular weight distribution and thereby improve processability simply by regulating the amounts of comonomer and activator used in the polymerization.

DETAILED DESCRIPTION OF THE INVENTION

Catalyst systems of the invention comprise an activator and a bimetallic indenoindolyl complex. The complex includes two metal atoms, which may be the same or different, from Groups 3–10. Preferably, the complexes include two Group 4–6 transition metals. Most preferred are complexes that include two Group 4 transition metal atoms, such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only $sp^3$-hybridized carbon on the indenyl ring are "trans" to each other. Such is the case in an indeno[1,2-b] ring system such as:

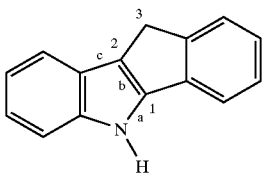

Suitable ring systems also include those in which the indole nitrogen and the sp³-hybridized carbon of the indene are beta to each other, i.e., they are on the same side of the molecule. This is an indeno[2,1-b]indole ring system:

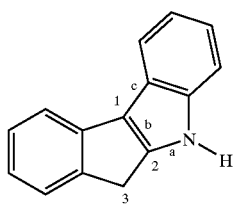

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

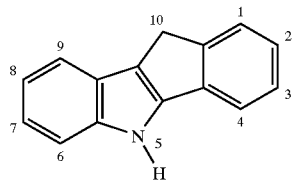

while 5,6-dihydroindeno[2,1-b]indole has the numbering:

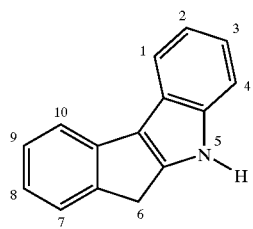

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The bimetallic complex incorporates two indenoindolyl groups. Each of these groups is "monoanionic," i.e., the cyclopentadienyl ring of each indenoindolyl group has a −1 charge and donates pi electrons to one of the metals. The indolyl nitrogen of each indenoindolyl group is typically substituted with an alkyl, aryl, or trialkylsilyl group. Alternatively, the nitrogen is attached to the divalent linking group as described below. Earlier, we disclosed bimetallic complexes in which the indenoindolyl groups are "dianionic" (see, e.g., U.S. Pat. No. 6,414,162). In those complexes, each indenoindole compound is deprotonated at both the indolyl nitrogen and the cyclopentadienyl group.

The indenoindolyl groups are joined by a divalent linking group. The linking group joins the indenoindolyls through an indenyl carbon or an indolyl nitrogen. The indenoindolyl groups can be joined through C-G-C, C-G-N, or N-G-N linkages, where G is the linking group, C is an indenyl methylene carbon, and N is an indolyl nitrogen. A wide variety of linking groups, are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-dimethylene, polymethylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis (dimethylsilyl), oxybis(dimethylsilyl), and the like. These and other divalent linking groups are described in the background references. (For some examples, see *J Organometal. Chem.* 460 (1993) 191; 518 (1996) 1; 580 (1999) 90.)

In addition to the linked monoanionic indenoindolyl groups, the bimetallic complex includes ancillary ligands that are bonded to each metal. Each metal has two or more neutral or anionic ancillary ligands that satisfy the valence of the metals. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl). Suitable polymerization-stable ligands include cyclopentadienyl, indenyl, fluorenyl, boraaryl, indenoindolyl, and the like.

In preferred catalyst systems of the invention, the bimetallic complex has the general structure: $X_nM$-J-G-J-$MX_n$ in which G is the divalent linking group, each J is independently an indenoindolyl group, each M is independently a Group 3–10 transition metal, each X is independently an ancillary ligand, and each n satisfies the valence of the metal. Particularly preferred complexes have one of the following general structures:

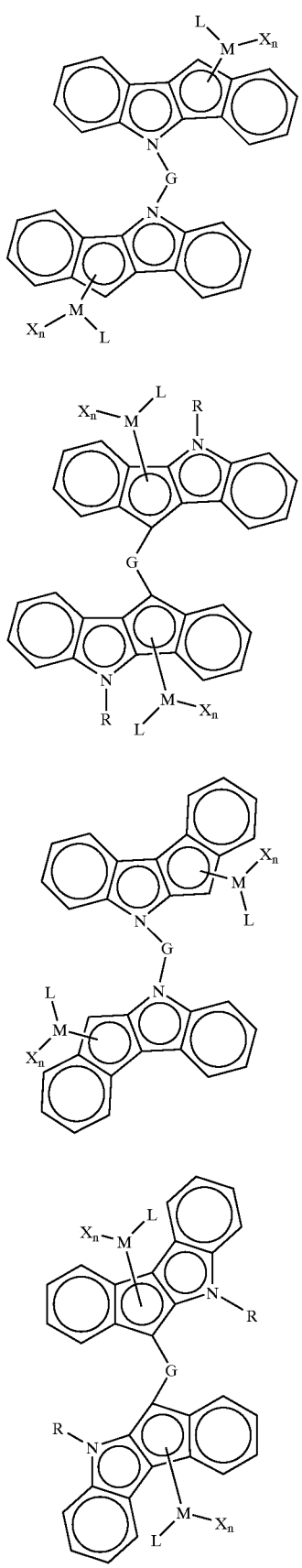
in which M, X, G, and n have the meanings described above, L is a polymerization-stable ancillary ligand selected from the group consisting of cyclopentadienyl, indenyl, fluorenyl, boraaryl, and indenoindolyl, and R is hydrogen or hydrocarbyl.
Exemplary bimetallic complexes of the invention:
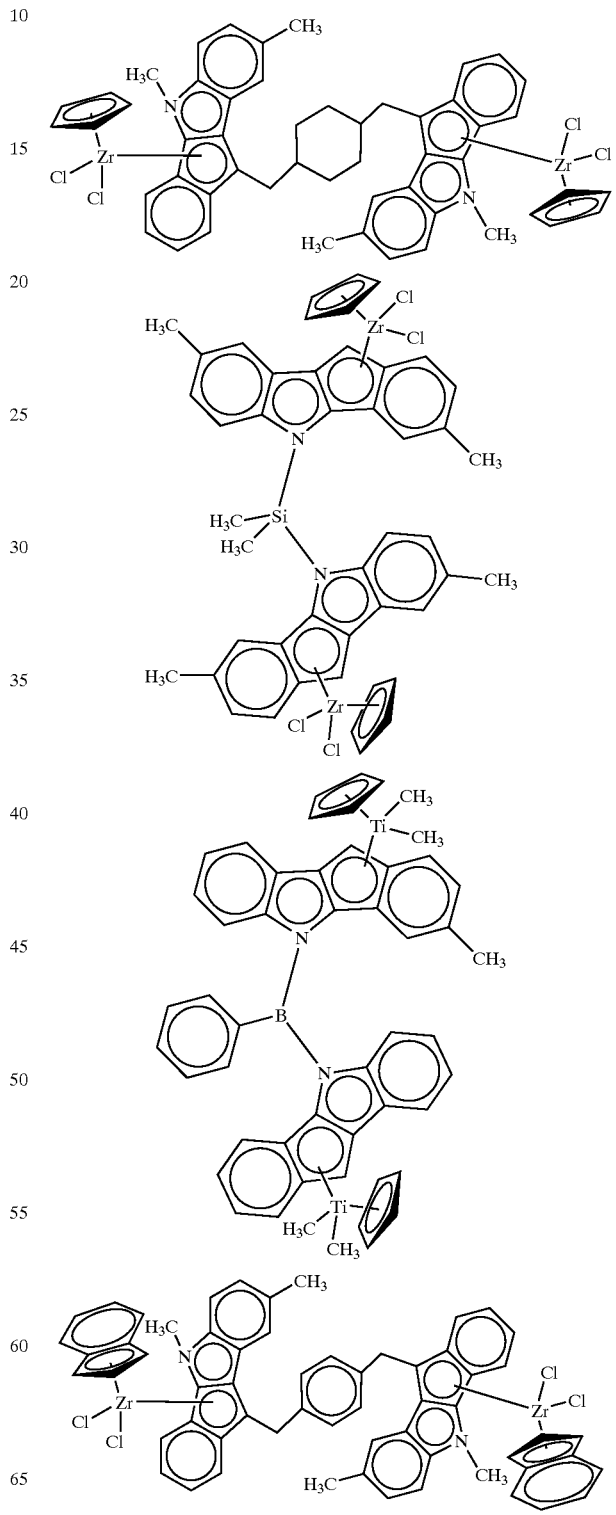

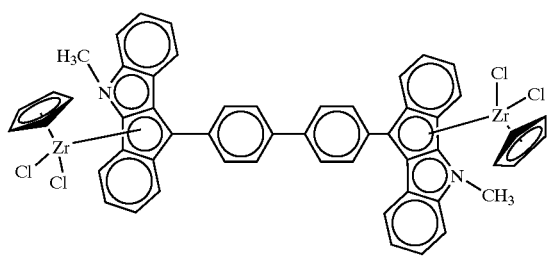
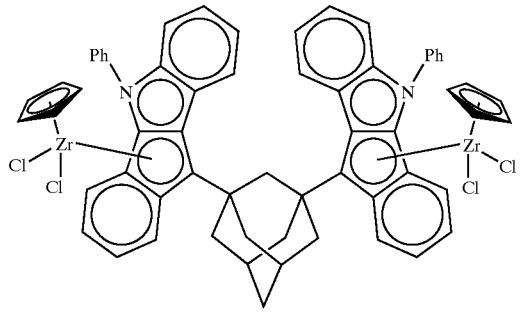
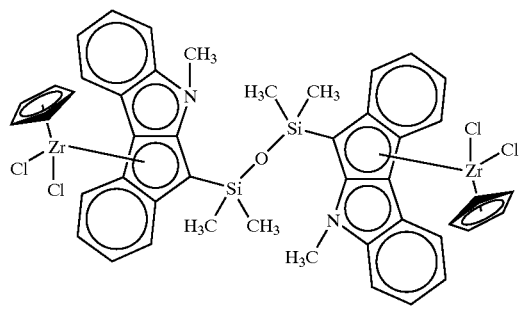
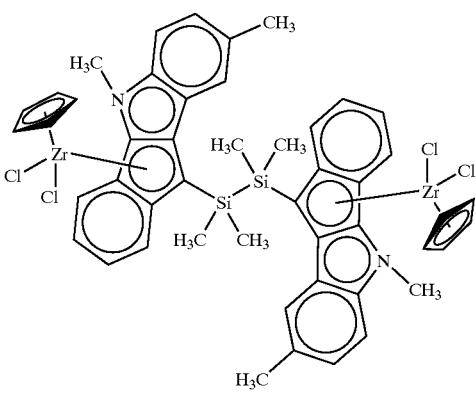
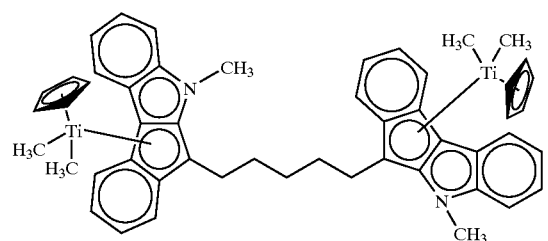
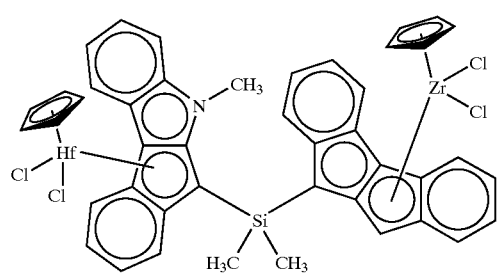
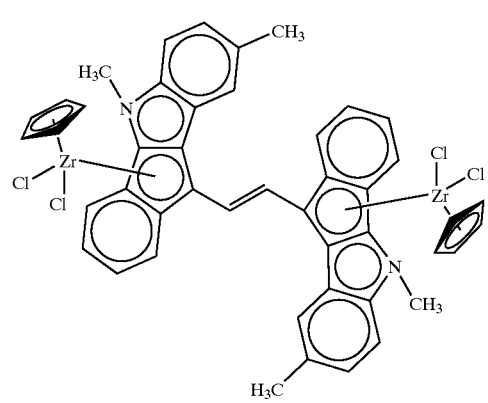

The complexes can be made by any suitable method; those skilled in the art will recognize a variety of acceptable synthetic strategies. Often, the synthesis begins with preparation of the desired indenoindole compound from particular indanone and arylhydrazine precursors. Next, the indenoindoles are usually linked together to give the ligand precursor. The final step normally involves reaction of the ligand precursor with a transition metal source to give the bimetallic complex. The exact synthetic steps and the sequence used will normally depend upon the type of divalent linking group used, the transition metal source(s), and whether the indenoindolyl groups will be joined through the indenyl carbons (C-G-C linked), the indolyl nitrogens (N-G-N linked), or one of each (C-G-N linked).

Consider the preparation of the N-G-N linked complex 6, below. An indenoindole compound is first prepared by reacting 6-methyl-1-indanone and p-tolylhydrazine. Deprotonation of the indenoindole at nitrogen, followed by reaction with 0.5 eq. of dichlorodimethylsilane gives a bis(indeno[1,2-b]indolyl)dimethylsilane (5). This neutral compound is doubly deprotonated and then reacted with 2 eq. of cyclopentadienyl-zirconium trichloride to give the desired bimetallic complex, 6. A similar approach is used to generate phenylboranyl complex 8.

A somewhat different approach is needed to make complexes having a C-G-C linkage. Here, it is best to use an N-substituted indenoindole compound. In preparing complex 10 below, we first N-methylate an indenoindole compound (see the preparation of 2). Deprotonation of the N-methylated indenoindole followed by reaction with 0.5 eq. of α,α'-dibromo-p-xylene gives xylyl-linked compound (9). This C-G-C linked compound is easily deprotonated and reacted with 2 eq. of CpZrCl₃ to give bimetallic complex 10.

In the final step, the ligand precursor is usually deprotonated with at least about 2 equivalents of a strong base. Two equivalents of transition metal source are then added to give the bimetallic complex. In another suitable approach, however, the ligand precursor is not deprotonated. Instead, the precursor is simply combined (and optionally heated) with a bis(dialkylamino)-substituted transition metal compound. This approach, known as "amine elimination," gives the complex without a discrete deprotonation step. See, e.g., U.S. Pat. No. 6,440,889, the teachings of which are incorporated herein by reference. For additional examples of this approach to making organometallic complexes, see U.S. Pat. No. 5,495,035; *J. Am. Chem. Soc.* 118 (1996) 8024; and *Organometallics* 15 (1996) 4045.

As will be apparent to those skilled in the art from the above discussion and the examples provided below, the synthetic steps required to prepare bimetallic complexes of the present invention are well-established and relatively straightforward.

Any convenient source of the transition metal can be used to make the bimetallic complex. The transition metal source conveniently has labile ligands such as halide or dialkylamino groups that are easily displaced by indenoindolyl anions. Examples are halides (e.g., $TiCl_4$, $ZrCl_4$), alkoxides, amides, and the like.

Catalyst systems of the invention include, in addition to the bimetallic indenoindolyl complex, an activator. The activator helps to ionize the bimetallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of bimetallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

The catalyst systems can be used with a support such as silica, alumina, titania, or the like. Silica is preferred. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The catalyst systems are particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

A wide variety of olefin polymerization processes can be used. Preferred processes are slurry, bulk, solution, and gas-phase proceses. A slurry or gas-phase process is preferably used. Suitable methods for polymerizing olefins using the catalysts of the invention are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

The organometallic complexes are generally prepared in a dry-box under a nitrogen atmosphere. Air-sensitive reagents are transferred by syringe or cannula using standard techniques.

PREPARATION OF COMPLEX 3

COMPARATIVE EXAMPLE (a) Preparation of Indeno[1,2-b]indole 1. A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) Preparation of 2 by N-Methylation. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17 0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product. Total yield of N-methylated indeno[1,2-b]indole 2 is 25.7 g (66%).

(c) Indeno[1,2-b]indolylzirconium Complex 3. In a glovebox under nitrogen, N-methylated indeno[1,2-b]indole 2 (14.2 g, 60.9 mmol), prepared as described earlier, is dissolved in toluene (175 mL). n-Butyllithium (38.0 mL of 2.5 M solution in hexanes, 95 mmol) is added carefully under vigorous stirring at room temperature to give a red solution. After one hour, a precipitate forms. The mixture is kept at room temperature overnight, and is then filtered and washed with toluene (100 mL) and then heptane (200 mL). The sticky product is dried under nitrogen in the glovebox and is collected and dried under vacuum.

A sample of the indeno[1,2-b]indolyl lithium salt produced above (10 g, 42 mmol) is dissolved in toluene (95 mL) to produce an orange slurry. Diethyl ether (35 mL) is added slowly to give an orange solution. This solution is added over 15 min. at room temperature with stirring to a slurry of cyclopentadienylzirconium trichloride (11 g, 42 mmol) in toluene (190 mL) and diethyl ether (190 mL). The mixture turns deep red and is kept at room temperature overnight. The slurry is filtered to recover a red solid, which is washed with toluene (200 mL) and dried under vacuum. Yield of complex 3: 16.5 g. The $^1H$ NMR spectrum is consistent with the proposed structure:

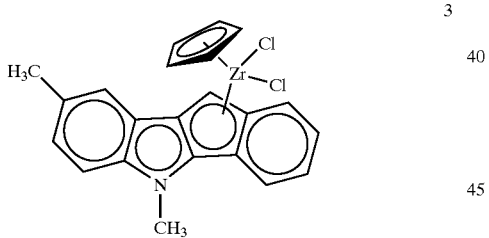

3

PREPARATION OF BIMETALLIC COMPLEX 6

(a) Preparation of bis(indenoindolyl)dimethylsilane 5. 3,8-dimethyl-indeno[1,2-b]indole (4) is prepared from 6-methyl-1-indanone and p-tolylhydrazine as described in the preparation of 1. A sample of 4 (2.73 g, 11.7 mmol) and diethyl ether (150 mL) are charged to a 500-mL round-bottom flask to make a slurry. n-Butyllithium (5.2 mL of 2.5 M solution in hexane, 13.0 mmol, 1.11 eq) is added at room temperature to give a bright-yellow slurry. The mixture is stirred overnight at room temperature. A solution of dichlorodimethylsilane (0.7 mL, 5.77 mmol, 0.50 eq.) in diethyl ether (about 10 mL) is added at room temperature to the yellow slurry, which turns pale immediately, then white after about 30 min. The mixture stirs at room temperature for 3 days, and is then filtered. The LiCl by-product is washed with diethyl ether. The washings are combined and stripped to give a yellow residue. The residue is washed with hexanes and dried under vacuum. Yield: 0.968 g (32%). The $^1H$ NMR spectrum is consistent with the structure proposed for bis(indeno[1,2-b]indolyl)dimethylsilane 5.

(b) Preparation of bimetallic complex 6. The bis(indeno[1,2-b]indolyl)dimethylsilane 5 (0.953 g, 182 mmol) and diethyl ether (100 mL) are charged to a 250-mL flask to give a colorless solution. n-Butyllithium (1.6 mL of 2.5 M solution in hexane, 4.0 mmol, 2.2 eq.) is added at room temperature, and the solution immediately turns bright yellow. The dianion mixture stirs overnight at room temperature.

In a separate 500-mL flask, cyclopentadienylzirconium trichloride (1.031 g, 3.65 mmol, 2 eq.), toluene (70 mL), and diethyl ether (10 mL) are combined to produce a gray slurry. The dianion mixture is added dropwise to afford an orange mixture. After completing the addition of the dianion, the mixture is cloudy and red-orange. The mixture stirs overnight at room temperature. The mixture is filtered, and the orange solids are washed with hexanes (30 mL) $^1H$ NMR analysis shows that the solids contain the desired bimetallic complex 6. Concentration of the filtrate to about 80 mL produces additional solids (0.29 g) which are isolated. $^1H$ NMR analysis shows that this material is monometallic bis(indenoindolyl) zirconium complex. Yield of 6: 0.47 g (25%)

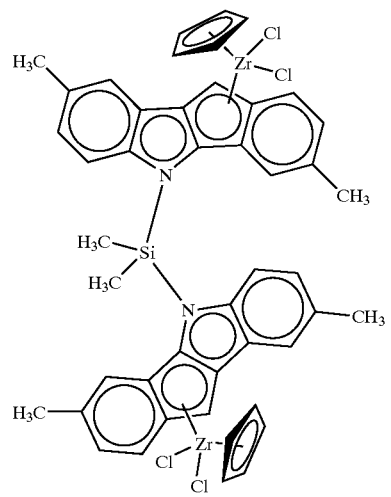

6

PREPARATION OF BIMETALLIC COMPLEX 8

(a) Preparation of bis(indenoindolyl)phenylborane 7.

Indeno[1,2-b]indole 1 (2.86 g, 13 mmol, prepared as previously described) is charged to a 250-mL flask, and diethyl ether (180 mL) is added to give a slurry. n-Butyllithium (5.8 mL of 2.5 M solution in hexane, 14.5 mmol, 1.11 eq.) is added carefully at room temperature. The mixture turns yellow and the indenoindole dissolves. After about 30 min., a yellow precipitate forms. The mixture stirs overnight at room temperature. A solution of dichlorophenylborane (0.85 g, 6.53 mmol, 0.50 eq.) in toluene (10 mL) is added to the anion. The mixture, which turns dark red-orange, is then stirred at room temperature for 3 days. The mixture is filtered. The solids (about 0.25 g) are found by $^1H$ NMR analysis to contain the desired bis(indenoindolyl)phenylborane 7. Volatiles are stripped from the filtrate to give an orange solid (2.9 g), which is dried under vacuum. $^1H$ NMR analysis of the orange solid indicates that this major portion of product is also the desired phenylborane compound 7.

(b) Preparation of bimetallic complex 8. Phenylborane 7 (1.52 g, 2.50 mmol, 1.0 eq.) is dissolved in diethyl ether (80 mL) and the solution is cooled to −78° C. Lithium diisopropylamide (2.6 mL of 2.0 M solution in heptane/tetrahydrofuran/ethylbenzene, product of Aldrich, 5.2 mmol, 2.1 eq.) is carefully added. The mixture, which turns dark red, is slowly warmed to room temperature and stirs overnight. Volatiles are removed under vacuum to give the dianion as a red solid (1.87 g). In a separate flask, cyclopentadienylzirconium trichloride (1.41 g, 4.99 mmol) is mixed with toluene (120 mL) and diethyl ether (50 mL). The dianion (1.87 g, 3.0 mmol) is added, and the mixture turns from orange to deep red. After stirring for 3 days at room temperature, the mixture is filtered. The filtrate, which contains the desired phenylborane compound, is concentrated and dried under vacuum. Yield of 8: 0.75 g (22%). The $^1$H NMR spectrum is consistent with the proposed structure:

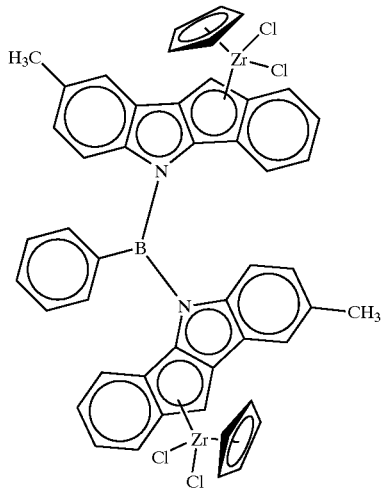

PREPARATION OF COMPLEX 10

(a) Preparation of bis(indeno[1,2-b]indolyl)xylyl compound 9.

A 500-mL flask is charged with α,α'-dibromo-p-xylene (1.87 g, 7.07 mmol, 1.0 eq.) and tetrahydrofuran (150 mL) is added to give a clear solution. Separately, a sample of N-methylated indeno[1,2-b]indole 2 is converted to the monoanion by reacting it with n-butyllithium in toluene, followed by vacuum stripping, as described above The anion (3.40 g, 14 mmol, 2.0 eq.) is combined with toluene (40 mL) and tetrahydrofuran (10 mL) to give a blood-red solution. This solution is added slowly via pipette at room temperature to the dibromoxylene solution, which becomes greenish-yellow. A thick precipitate results. The mixture is stirred at room temperature overnight. The mixture is filtered to give solids and a yellow filtrate that turns dark. The solids are washed with diethyl ether and dried, then are dissolved in dichloromethane (900 mL). The dichloromethane solution is washed with water (2×500 mL), dried over sodium sulfate, filtered, and concentrated. The resulting yellow solid is dried under vacuum. It has a $^1$H NMR spectrum consistent with xylyl compound 9. Solids precipitate from the original dark yellow filtrate. These are isolated and washed with hexanes. The precipitate is more of the desired xylyl compound 9. Yield: 2.85 g (71%).

(b) Preparation of bimetallic complex 10. A flask is charged with xylyl compound 9 (1.01 g, 1.78 mmol, 1.0 eq.) and diethyl ether (75 mL) is added. n-Butyllithium (1.5 mL of 2.5 M solution in hexane, 3.75 mmol, 2.1 eq.) is added by syringe at room temperature, and the mixture turns bright yellow. The dianion mixture is stirred overnight at room temperature. In a separate flask, cyclopentadienylzirconium trichloride (1.00 g, 3.55 mmol, 2.0 eq.) is combined with toluene (70 mL) and diethyl ether (10 mL). The dianion is added at room temperature by pipette, and the mixture turns orange. The mixture stirs for 3 days at room temperature, and is then filtered and washed with toluene (10 mL) followed by hexanes (20 mL). The orange solids are collected and dried under vacuum. The $^1$H NMR spectrum is consistent with the structure proposed for bimetallic complex 10. Yield: 1 10 g (28%).

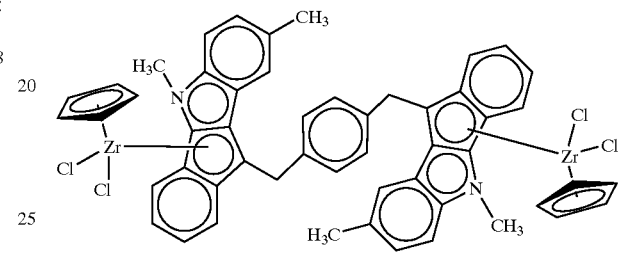

PART 1: SLURRY PROCESS

Preparation of Supported Catalysts for Examples 1–21 and C22 General Procedure

Silica (Davison 948) is calcined for 4 h. Zirconium complexes (quantity is determined by the required Al/Zr ratios presented in Table 1) and optionally tris (pentafluorophenyl)borane complexes (quantity is determined by the required B/Zr ratio of 1 5) are dissolved in a 4.14 M MAO solution in toluene (1.6 mL), and this mixture is added slowly to the silica (2.0 g). The free-flowing catalysts are used in polymerization experiments without additional drying.

Ethylene Copolymerizations with 1-Hexene in Slurry Polymerizations (Examples 1–21 and C22)

A two-liter, stainless-steel reactor is charged with isobutane (900 mL), 1-hexene (100 mL), triisobutylaluminum (0.8 mL of 1.0 M solution in hexane) and optionally hydrogen (measured as a pressure drop from a 7-mL vessel, Table 1). The reactor is pressurized with ethylene to 350 psig, and the contents are heated to 70° C. A sample of silica-supported catalyst (0.1 to 0.5 g) is injected into the reactor to start the polymerization. Ethylene is supplied on demand to keep the reactor pressure at 350 psig. After 30 min., the reactor is vented to recover polyethylene (10 to 50 g, calculated activities and polymer properties are presented in Table 1).

As the results in Table 1 demonstrate, the use of complex 10 (p-xylyl-coupled bis(indenoindolyl)zirconium complex) provides the ability to make ethylene-hexene copolymers having fractional melt indices (see Examples 1–7). Moreover, the bimetallic catalyst also makes it possible to broaden molecular weight distribution in a predictable way by varying the amount of comonomer or aluminum activator. An important trade-off is the reduced activity of bimetallic complex 10 versus monometallic complex 3. As Examples 3 and 6 show, the activity of the bimetallic complex can be boosted by including some F15 activator.

Low MI material can also be made with complex 8, the phenylboranyl-linked bimetallic complex (see Examples 8–14). The molecular weight distribution is broadenable, but to a lesser degree compared with complex 10. Again, the activity of this bimetallic complex is boosted by including F15 activator Zr complex is added dropwise to the silica slurry, and the mixture is stirred for 1.5 h. The slurry is filtered, and the solids are washed with heptane (3×10 mL). The supported catalyst is then dried under vacuum at room temperature. Component loadings: MAO: 9.8 mmol/g silica; Complex 3: 0.044 mmol/g silica. Al/Zr=223.

TABLE 1

Slurry Polymerization Results

| Ex # | Complex | Al/Zr (m/m) | hexene (mL) | F15 ? | Activity (kg/g Zr/h) | Density (g/cm$^3$) | MI | MIR | Mw/Mn | Comments |
|---|---|---|---|---|---|---|---|---|---|---|
| 1 | 10 | 50 | 100 | No | 75 | 0.930 | 0.43 | 24.1 | 4.51 | Low MIs are available. |
| 2 | 10 | 200 | 100 | No | 140 | 0.932 | 0.52 | 23.2 | 4.00 | MIR can be fine-tuned |
| 3 | 10 | 400 | 100 | Yes | 215 | 0.933 | 0.50 | 20.5 | 4.38 | by varying the amount |
| 4 | 10 | 800 | 100 | No | 170 | 0.933 | 0.45 | 20.6 | 3.66 | of TIBAL and comonomer. |
| 5 | 10 | 200 | 150 | No | 130 | 0.928 | 0.60 | 21.2 | 3.95 | Can use F15 to boost |
| 6 | 10 | 200 | 150 | Yes | 220 | 0.930 | 0.78 | 21.4 | 3.93 | activity. |
| 7 | 10 | 400 | 150 | No | 180 | 0.932 | 0.64 | 19.2 | 4.04 | |
| 8 | 8 | 200 | 150 | Yes | 108 | 0.934 | 0.50 | 22.8 | 3.74 | Low MIs are available. |
| 9 | 8 | 200 | 150 | No | 75 | 0.936 | 0.55 | 26.2 | 3.73 | Can use F15 to boost |
| 10 | 8 | 400 | 150 | No | 93 | 0.941 | 0.43 | 24.9 | 3.77 | activity. |
| 11 | 8 | 100 | 150 | No | 75 | 0.942 | 0.75 | 22.0 | 3.97 | |
| 12 | 8 | 50 | 100 | No | 30 | 0.937 | 0.30 | 27.0 | 4.03 | |
| 13 | 8 | 100 | 100 | Yes | 70 | 0.934 | 0.27 | 23.9 | 3.86 | |
| 14 | 6 | 200 | 100 | No | 72 | 0.945 | 0.20 | 24.5 | 4.12 | |
| 15* | 6 | 50 | 100 | No | 60 | 0.936 | 0.70 | 20.5 | 3.95 | Hydrogen added. Lower |
| 16* | 6 | 200 | 100 | No | 114 | 0.937 | 1.31 | 20.0 | 3.41 | MIs can be obtained |
| 17* | 6 | 200 | 100 | Yes | 155 | 0.937 | 1.28 | 21.0 | 3.50 | by omitting hydrogen |
| 18* | 6 | 400 | 100 | No | 125 | 0.937 | 0.61 | 21.5 | 3.37 | MIR is more |
| 19* | 6 | 200 | 150 | No | 85 | 0.932 | 1.14 | 20.4 | 3.54 | independent of the |
| 20* | 6 | 200 | 150 | Yes | 170 | 0.933 | 1.07 | 21.6 | 3.45 | amount of TIBAL and |
| 21* | 6 | 400 | 150 | No | 140 | 0.937 | 1.06 | 20.3 | 3.35 | comonomer. Can use F15 to boost activity. |
| C22 | 3 | 200 | 100 | No | 180 | 0.924 | 0.87 | 18.3 | 2.90 | Good activity but relatively high MI. |

All polymerizations are performed at 70° C., 350 psig ethylene, no hydrogen except * designates a run in which hydrogen (dpsi = 10 from a 7 cm$^3$ vessel) is used.
Complexes:
3 = indenoindolyl(Cp)ZrCl$_2$.
6 = dimethylsilyl-linked bimetallic.
8 = phenylboranyl-linked bimetallic.
10 = p-xylyl-linked bimetallic.
Triisobutylaluminum activator used in Al:Zr molar ratio specified.
F15 = tris(pentafluorophenyl)borane (B/Zr mole ratio = 1.5)
MI = melt index.
MIR = melt index ratio (HLMI/MI).

As the results from Examples 15–21 show, the dimethylsilyl-linked bimetallic complex (6) gives MIs of about 1 when hydrogen is included. Without hydrogen, the MIs are fractional. Interestingly, the molecular weight distribution with complex 6 is relatively insensitive to changes in comonomer or aluminum level. This result parallels our earlier results with complex 3.

PART 2: GAS-PHASE POLYMERIZATIONS
COMPARATIVE EXAMPLE A

Supported Catalyst from Monometallic Complex 3

1-Octadecanol (90 mg, 0.33 mmol) is added to methylalumoxane (6.2 mL of 30% MAO in toluene, product of Albemarle, 29 mmol Al), and the resulting solution is stirred at room temperature for 1 h. A portion of the solution (2.5 mL, 12 mmol Al) is added dropwise to a slurry of calcined silica (Grace/Davison 955 silica, calcined at 600° C. for 12 h under nitrogen, 3.0 g) in toluene (18 mL). The slurry is stirred for 1 h. Zirconium complex 3 (72 mg, 0.13 mmol) is added to the remainder of the octadecanol/MAO solution, and the resulting solution is stirred for 1 h. The solution of

EXAMPLE B

Supported Catalyst from Bimetallic Complex 10

The procedure of Comparative Example A is followed, except that bimetallic complex 10 (74 mg, 0.13 mmol Zr) is used instead of monometallic complex 3. Component loadings: MAO: 9.6 mmol/g silica; Complex 10: 0.022 mmol/g silica (0.044 mmol Zr/g silica. Al/Zr=215.

Gas-Phase Polymerizations

Polymerization experiments are performed in a jacketed 3.3-L vessel equipped with a helical agitator, a thermocouple, and a valve for removing polymer. The jacket contains water, which is recirculated for temperature control at 71° C. Supported catalyst (about 200 mg) and triisobutylaluminum-treated silica (about 140 mg) are added to the bed through a polyethylene tube. (The amount of supported catalyst is adjusted to achieve a targeted productivity of about 150 g of polyethylene per hour.) The agitator is started and the reactor is pressurized with nitrogen (100 psig). 1-Hexene (21 mL) is added, followed by enough ethylene to give a reactor pressure of 300 psig. This results in an ethylene concentration of 60 mole % and a 1-hexene concentration of 3.4 mole %. A mixture of 10 wt. % 1-hexene in ethylene is fed to maintain 300 psig in the reactor. When the total ethylene feed reaches about 300 g, the feed is stopped, and the reactor is vented. The polymer (about 330 g) is drained from the reactor, and the polymerization is repeated three more times to remove the original seed bed. In succeeding runs, the amount of catalyst charged is adjusted so that the total time required to consume 300 g of ethylene is 2–3 h. The fourth batch of polymer drained from the reactor is analyzed; results appear in Table 2.

TABLE 2

Use of Bimetallic Indenoindolyl Complex in a Gas-Phase Process

| Ex. | Complex | Activity g/g cat h | MI | Mw/Mn | Density (g/cm³) |
|-----|---------|--------------------|----|----|------|
| C17 | 3 | 1700 | 1.94 | 2.51 | 0.918 |
| 18 | 10 | 335 | 1.24 | 3.33 | 0.923 |

The results from the gas-phase experiments confirm the results obtained using the slurry process. In particular, the results show that bimetallic complexes can be used to prepare linear low density polyethylenes having reduced melt index and broadened molecular weight distribution. As seen in the slurry experiments, these benefits come at the expense of reduced catalyst activity and slightly less efficient comonomer incorporation (as indicated by higher density).

The preceding examples are meant only as illustrations. The following claims define the invention.

We claim:

1. A catalyst system which comprises
   (a) an activator; and
   (b) a bimetallic complex which comprises
      (i) two Group 3–10 transition metals, which may be the same or different;
      (ii) two monoanionic indenoindolyl groups, each of which is pi-bonded through its cyclopentadienyl ring to one of the metals;
      (iii) a divalent linking group that joins the indenoindolyl groups through an indenyl carbon or an indolyl nitrogen of each indenoindolyl group; and
      (iv) two or more ancillary ligands bonded to each metal that satisfy the valence of the metals.

2. The catalyst system of claim 1 wherein the activator is selected from the group consisting of alkyl alumoxanes, alkylaluminum compounds, aluminoboronates, organoboranes, ionic borates, and ionic aluminates.

3. The catalyst system of claim 1 wherein each of the transition metals is a Group 4 metal.

4. The catalyst system of claim 1 wherein each of the transition metals is zirconium.

5. The catalyst system of claim 1 wherein the divalent linking group is selected from the group consisting of dialkylsilyl, diarylsilyl, alkylboranyl, arylboranyl, siloxy, polysiloxy; and hydrocarbyl.

6. The catalyst system of claim 5 wherein the divalent linking group is a hydrocarbyl group selected from the group consisting of alkylene, dialkylene, polyalkylene, arylene, diarylene, polyarylene, cycloalkyl, adamantyl, aralkylene, alkenyl, and alkynyl.

7. The catalyst system of claim 6 wherein the divalent linking group is p-xylyl.

8. The catalyst system of claim 1 wherein at least one of the metals is bonded to a polymerization-stable ancillary ligand selected from the group consisting of cyclopentadienyl, indenyl, fluorenyl, boraaryl, and indenoindolyl.

9. The catalyst system of claim 8 wherein the remaining ancillary ligands are halides or alkyls.

10. The catalyst system of claim 1 wherein the bimetallic complex has the general structure: $X_nM$-J-G-J-$MX_n$ in which G is a divalent linking group, each J is independently an indenoindolyl group, each M is independently a Group 3–10 transition metal, each X is independently an ancillary ligand, and each n satisfies the valence of the metal.

11. The catalyst system of claim 10 wherein the bimetallic complex has a structure selected from the group consisting of:

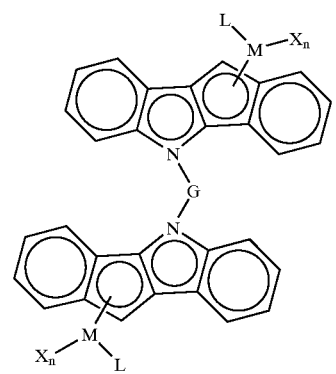

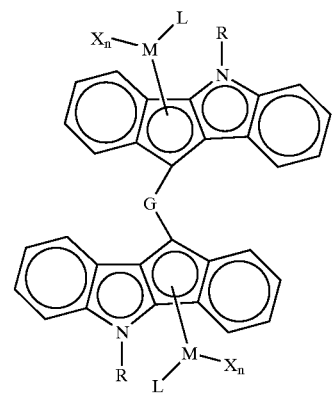

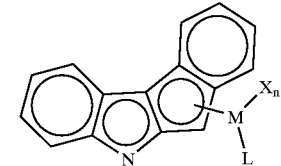

and

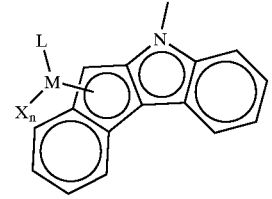

-continued
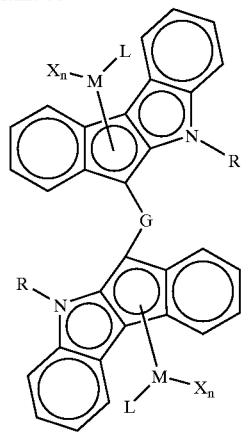
in which M, X, G, and n have the meanings defined in claim 10, L is a polymerization-stable ancillary ligand selected from the group consisting of cyclopentadienyl, indenyl, fluorenyl, boraaryl, and indenoindolyl, and R is hydrogen or hydrocarbyl.
12. A process which comprises polymerizing one or more olefins in the presence of a catalyst system of claim 1.
* * * * *